(12) United States Patent
Schriber et al.

(10) Patent No.: US 10,726,591 B2
(45) Date of Patent: Jul. 28, 2020

(54) NARRATIVE VISUALIZATION SYSTEM

(71) Applicant: Disney Enterprises, Inc., Burbank, CA (US)

(72) Inventors: Sasha Anna Schriber, Zurich (CH); Nam Wook Kim, Cambridge, MA (US); Hanspeter Pfister, Arlington, MA (US); Markus Gross, Zurich (CH)

(73) Assignee: Disney Enterprises, Inc., Burbank, CA (US)

(*) Notice: Subject to any disclaimer, the term of this patent is extended or adjusted under 35 U.S.C. 154(b) by 122 days.

(21) Appl. No.: 15/426,754

(22) Filed: Feb. 7, 2017

(65) Prior Publication Data
US 2018/0225849 A1   Aug. 9, 2018

(51) Int. Cl.
*G06T 11/20* (2006.01)
*G06F 16/34* (2019.01)
*G06F 40/30* (2020.01)
*G06F 40/131* (2020.01)

(52) U.S. Cl.
CPC ......... *G06T 11/206* (2013.01); *G06F 16/345* (2019.01); *G06F 40/131* (2020.01); *G06F 40/30* (2020.01); *G06T 11/20* (2013.01); *G06T 2200/24* (2013.01)

(58) Field of Classification Search
CPC ................................ G06T 11/20; G06T 17/27
See application file for complete search history.

(56) References Cited

U.S. PATENT DOCUMENTS

2013/0290871 A1* 10/2013 Jordan ............... H04L 65/403
715/753
2018/0374192 A1* 12/2018 Kunkel ............... G06T 15/205

OTHER PUBLICATIONS

Wilhelm, Thomas, et al. *To see or Not to See—an Interactive Tool for the Visualization and Analysis of Shakespeare Plays.* Media Informatics Group, University of Regensburg, Regensburg, Germany. Jun. 2013. pp. 1-10.
Tapaswi, M., et al. *StoryGraphs: Visualizing Character Interactions as a Timeline.* IEEE Conference on Computer Vision and Pattern Recognition (CVPR), Jun. 2014, pp. 1-8.

(Continued)

*Primary Examiner* — Matthew Salvucci
(74) *Attorney, Agent, or Firm* — Farjamin & Farjami LLP

(57) ABSTRACT

According to one implementation, a narrative visualization system includes a computing platform having a hardware processor and a system memory storing a narrative visualization software code. The hardware processor is configured to execute the narrative visualization software code to receive multiple media files. For each of the media files, the hardware processor is further configured to execute the narrative visualization software code to parse the media file to identify a primary content and metadata describing the primary content, to analyze the metadata to determine representative features of the primary content, and to generate a visualization of the primary content based on the metadata and the representative features. The visualization depicts a temporal flow of the primary content in a story tune of the primary content in apposition to a temporal flow of the primary content in a narrative time of the primary content.

18 Claims, 8 Drawing Sheets

(56) References Cited

OTHER PUBLICATIONS

Tanahashi, Yuzuru, and Ma, Kwan-Liu. *Design Considerations for Optimizing Stotyline Visualization*. IEEE Transactions on Visualization and Computer. Graphics, vol. 18, No. 12, Dec. 2012. pp. 2679-2688.

Sinclair, Stefan, and Ruecker, Stan. *The Digital Play Book: An Environment for Interacting with Play Scripts*. Canadian Theater Review, Summer 2006. pp. 38-41.

Sharma, Rasagy, and Rajamanickam, Venkatesh. *Using Interactive Data Visualization to Explore Non-Linear Movie Narratives*. Parsons Journal for Information Mapping, vol. VII, Issue 1, Spring 2015, pp. 1-12.

Meidiana, Amyra, and Hong, Seok-Hee, *MultiStory: Visual Analytics of Dynamic Multi-Relational Networks*. IEEE Pacific Visualization Symposium, Apr. 2015, pp. 75-79.

Liu, Shixia, et al. *StoryFlow: Tracking the Evolution of Stories*. IEEE Trans. Vis. Comput. Graph., Oct. 2013. pp. 1-10.

Nam Wook, Kim et al. *Tracing Genealogical Data with TimeNets*. Advanced Visual Interfaces, Stanford Visualization Group, Stanford University, Stanford, California. May 2010. pp. 1-8.

Kaminski, J., Schober, et al. (2012). "*Moviegalaxies—Social Networks in Movies*", http://moviegalaxies.com, Aug. 2012. Accessed Jul. 10, 2017. pp. 1.

Hoyt, Eric, et al. *Visualizing and Analyzing the Hollywood Screenplay with ScripThreads*. DHQ: Digital Humanities Quarterly, vol. 8, No. 4, 2014. pp. 1-24.

Denis, Alexandre, et al. *Visualization of Affect in Movie Scripts*. Empatex, 1st International Workshop on Empathic Televison Experiences at TVX 2014, Newcastle, United Kingdom Jun. 2014. pp. 1-4.

Wu, Yanhong, et al. *egoSlider. Visual Analysis of Egocentric Network Evolution*. IEEE. Transactions on Visualization and Computer graphics, Jan. 2016. pp. 260-269.

Bonato, Anthony, et al. *Mining and Modeling Character Networks*\*. Algorithms and Models for the Web Graph. WAW 2016. Lecture Notes in Computer Science, vol. 10088. Springer, Cham. pp. 1-12.

Bilenko, Natalia, *The Narrative Explorer*. EECS Department, University of California, Berkeley, California, May 2016. 1-10.

\* cited by examiner

NARRATIVE VISUALIZATION SYSTEM

BACKGROUND

Nonlinear narrative is a widely used storytelling device in various types of art and entertainment, including literature, film, and digital media, for example. Nonlinear narrative can make a story more engaging and memorable by conveying the story out of chronological order, so that relationships among events in the story may not follow the original causality pattern established by the story plot. Due to its wide use, a technique for analyzing nonlinear narratives could provide useful insights for authors, academics, and consumers of literature and entertainment content narrated non-linearly. In particular, analysis of the relationship between narrative time and story time may benefit authors by shedding light on various ways to arrange scenes out of chronological order in order to increase suspense or otherwise heighten audience engagement.

Although techniques for analyzing stories qualitatively, such as through close reading, and quantitatively, such as through distance reading, have been developed, relatively little analysis has been directed to the temporal order of events in narrative. One explanation for the scarcity of analytical techniques for investigating temporal ordering within storytelling, particularly in the computational domain, is that it typically requires human-level cognitive processing to reconstruct the temporal relationship between narrative order and storyline.

SUMMARY

There are provided systems and methods for generating narrative visualizations, substantially as shown in and/or described in connection with at least one of the figures, and as set forth more completely in the claims.

DETAILED DESCRIPTION

Figure 1:
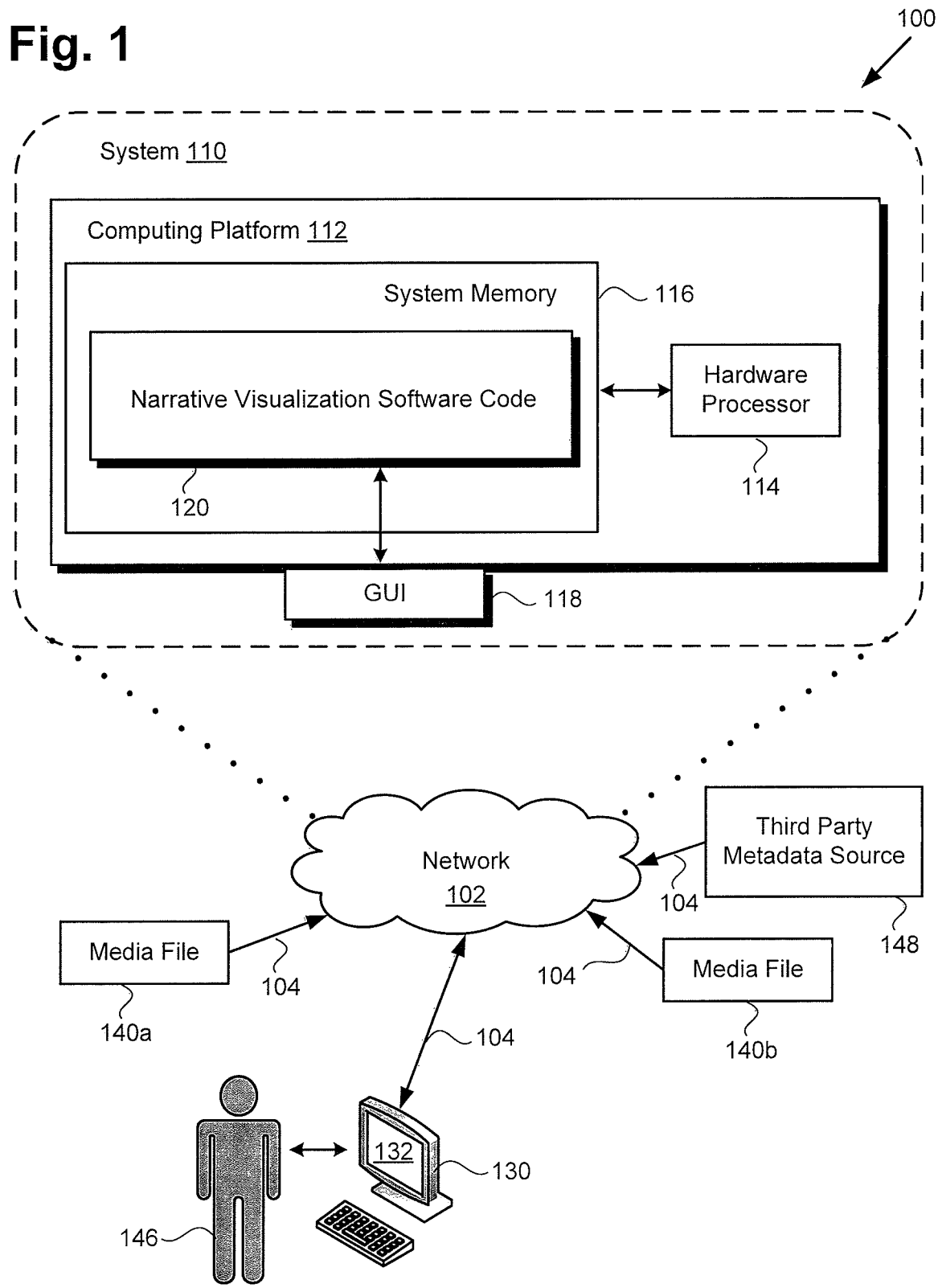
FIG. 1 shows a diagram of an exemplary system for generating narrative visualizations, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

As stated above, nonlinear narrative is a widely used storytelling device in various types of art and entertainment, including literature, film, and digital media, for example. Nonlinear narrative can make a story more engaging and memorable by conveying the story out of chronological order, so that relationships among events in the story may not follow the original causality pattern established by the story plot.

As further stated above, due to its wide use, a technique for analyzing nonlinear narratives could provide useful insights for authors, academics, and consumers of literature and entertainment content narrated non-linearly. In particular, analysis of the relationship between narrative time and story time may benefit authors by shedding light on various ways to arrange scenes out of chronological order in order to increase suspense or otherwise heighten audience engagement. Nevertheless, and although techniques for analyzing stories qualitatively, such as through close reading, and quantitatively, such as through distance reading, have been developed, relatively little analysis has been directed to the temporal order of events in narrative.

The present application discloses a narrative visualization solution that addresses and overcomes the deficiencies in the conventional art by substantially optimizing the process of evaluating and comparing complex storylines. As is further described below, by generating visualizations of the primary media content (hereinafter "primary content") contained in media file that depicts the story time of the primary content in apposition to its narrative time, the present application discloses a solution that renders the temporal flow of the primary content visually recognizable.

In addition, by providing a graphical user interface (GUI) enabling a user to select and interact with a visualization of primary content, the present solution provides a powerful tool for exploration and evaluation of the primary content. Moreover, by enabling the user to navigate to additional visualizations, such as circular visualizations profiling the participation of respective dramatic characters in narrating the story, the present solution advantageously allows the user to investigate the prominence of various characters with respect to the storyline.

It is noted that the present application refers to temporal features described as "narrative time" and "story time" within a particular storyline. As defined in the present application, narrative time is linear with respect to the advancement of the storyline. For instance where a storyline includes one hundred (100) scenes presented in order from 1-100, the narrative time of the story corresponds to advancement from scene 1 to scene 100 sequentially. However, many storylines include scenes that are so called flashbacks and address events in the past with respect to the storyline present. In addition, many storylines include dream sequence scenes, flash-forward scenes, or other dramatic contrivances for addressing events in the future with respect to the storyline present. As defined in the present application, those past and future events with respect to the storyline present define a temporal flow that is linear in story time, i.e., past events precede present events and present events precede future events in story time.

The circular visualizations generated by the systems and according to the methods disclosed in the present application that correspond respectively to dramatic characters in the primary content may present some aspects of a character's profile as concentric circles and/or rings for which advancement in a clockwise (or counter-clockwise) direction is linear with respect to narrative time, for example. In those implementations, and where the storyline includes flashbacks or addresses future events, the circular visualization will be linear with respect to narrative time, but non-linear with respect to story time. It is noted that, conversely, in some implementations in which advancement in a clockwise or counter-clockwise direction along circles or rings of the circular visualization is linear with respect to story time, the circular visualization may be non-linear with respect to narrative time.

FIG. 1 shows a diagram of one exemplary implementation of a system for generating narrative visualizations. As shown in FIG. 1, narrative visualization system 110 having computing platform 112 and providing GUI 118 is utilized in communication environment 100. Computing platform 112 includes hardware processor 114 and system memory 116. As further shown in FIG. 1, system memory 116 includes narrative visualization software code 120 stored therein. Communication environment 100 also includes network 102 interactively linking narrative visualization system 110 with third party metadata source 148 and client system 130 via network communication links 104. Also shown in FIG. 1 are media files 140a and 140b, display 132 of client system 130, and system user 146.

It is noted that although FIG. 1 depicts narrative visualization system 110 as including single computing platform 112, more generally, narrative visualization system 110 may include one or more computing platforms, such as computer servers for example, which may be co-located, or may form an interactively linked but distributed system. For example, narrative visualization system 110 may be a cloud based system. As a result, hardware processor 114 and system memory 116 may correspond to distributed processor and memory resources within narrative is visualization system 110. Thus, it is to be understood that the features attributed to narrative visualization software code 120 below by reference to FIG. 2 of the present application may be stored remotely from one another within the distributed memory resources of narrative visualization system 110.

According to the implementation shown by FIG. 1, system user 146 may utilize client system 130 to interact with narrative visualization system 110 over network 102. In one such implementation, as noted above, narrative visualization system 110 may be a cloud based system including one or more web servers, accessible over the Internet. Alternatively, narrative visualization system 110 may correspond to one or more computer servers supporting a local area network (LAN), or included in another type of limited distribution network. System user 146 may utilize client system 130 to interact with narrative visualization system 110 via GUI 118 and display 132, and to use narrative visualization software code 120, executed by hardware processor 114, to generate visualizations of primary content included in media files 140a and/or 140b.

It is noted that, although client system 130 is shown as a personal computer (PC) in FIG. 1, that representation is provided merely as an example. In other implementations, client system 130 may be any other suitable mobile or stationary computing device or system. For example, in other implementations, client system 130 may take the form of a laptop computer, tablet computer, digital media player, gaming console, or smartphone, for example. It is further noted that display 132 may take the form of a liquid crystal display (LCD), a light-emitting diode (LED) display, an organic light-emitting diode (OLED) display, or another suitable display screen that performs a physical transformation of signals to light.

Figure 2:
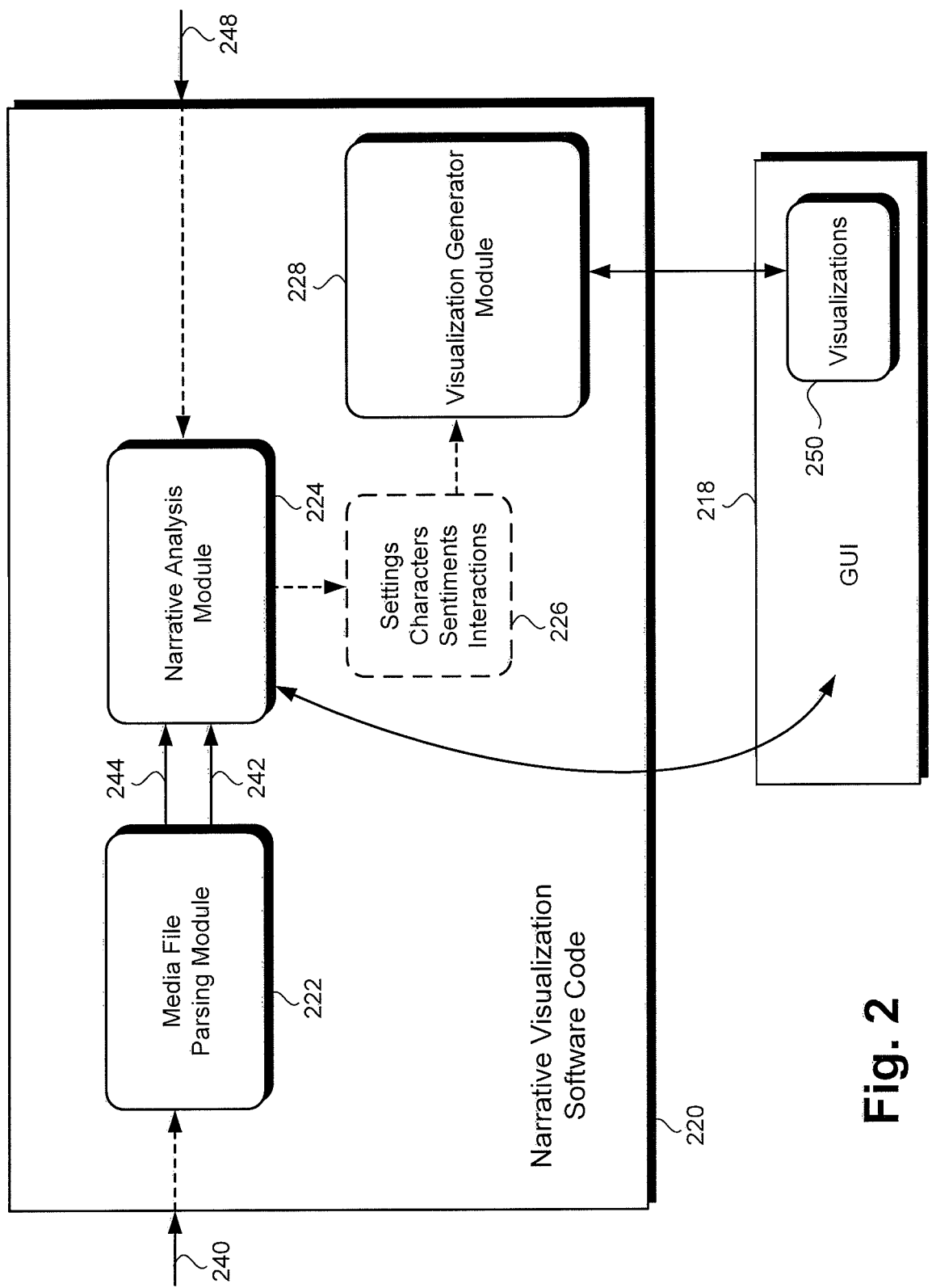
FIG. 2 shows a diagram of an exemplary narrative visualization software code suitable for use by a system for generating narrative visualizations, according to one implementation.

FIG. 2 shows a more detailed representation of narrative visualization software code 220 suitable for use in narrative visualization system 110 in FIG. 1, according to one exemplary implementation. As shown in FIG. 2, narrative visualization software code 220 may receive media files 240, each including primary content 242 and metadata 244 describing primary content 242, as inputs, and may generate visualizations 250 as outputs. As further shown in FIG. 2, narrative visualization software code 220 includes media file parsing module 222 for identifying primary content 242 and metadata 244, and narrative analysis module 224 for determining representative features 226 of primary content 242. In addition, narrative visualization software code 220 includes visualization generator module 228 for generating visualizations 250.

Also shown in FIG. 2 are metadata 248 received from a third party metadata source, such as third party metadata source 148, in FIG. 1, and GUI 218 enabling interaction by a system user, such as system user 146, in FIG. 1, with visualizations 250. Narrative visualization software code 220 and GUI 218, in FIG. 2, correspond respectively in general to narrative visualization software code 120 and GUI 118, in FIG. 1, and may share any of the characteristics attributed to those corresponding features by the present disclosure. That is to say, any characteristics attributed to narrative visualization software code 120 and GUI 118 may also be attributed to respective narrative visualization software code 220 and GUI 218, while any characteristics attributed to narrative visualization software code 220 and GUI 218 may also be attributed to respective narrative visualization software code 120 and GUI 118.

Media files 240 correspond to both of media files 140a and 140b, in FIG. 1, and more generally, may correspond to any number of media files received by narrative visualization software code 120/220 of narrative visualization system 110. Moreover, it is noted that visualizations 250 correspond respectively to primary content 242 included in media files 240. Thus, where media files 240 are representative of media files 140a and 140b, visualizations 250 are representative of respective corresponding visualizations 250a and 250b provided via GUI 218. By analogy, where media files 240 are representative of multiple additional media files, visualizations 250 may be representative of respective corresponding additional visualizations.

It is noted that, in various implementations, visualizations 250, when generated using narrative visualization software code 120/220, may be stored in system memory 116 and/or may be copied to non-volatile storage (not shown in FIG. 1 or 2), prior to and/or subsequent to being provided to system user 146 via GUI 118/218. Alternatively, or in addition, in some implementations, visualizations 250 may be sent to client system 130 for presentation on display 132, for example by being transferred via network communication links 104 of network 102.

Figure 3:
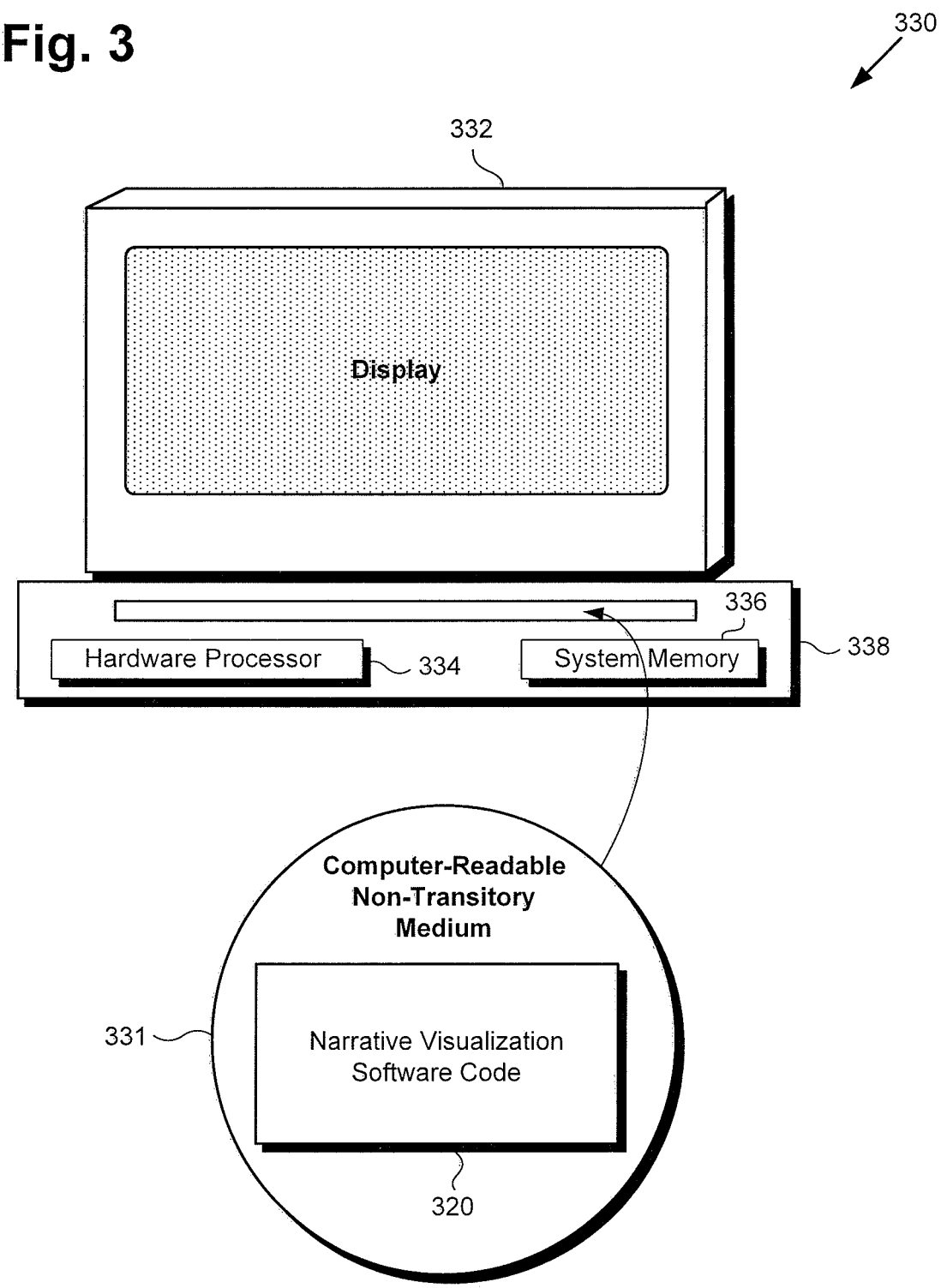
FIG. 3 shows an exemplary system and a computer-readable non-transitory medium including instructions enabling execution of a method for generating narrative visualizations, according to one implementation.

FIG. 3 shows exemplary system 330 and computer-readable non-transitory medium 331 including instructions enabling execution of a method for generating narrative visualizations, according to one implementation. System 330 includes computer 338 having hardware processor 334 and system memory 336, interactively linked to display 332. Display 332 may take the form of an LCD, LED display, OLED display, or another suitable display screen that performs a physical transformation of signals to light. System 330 including display 332 and computer 338 having hardware processor 334 and system memory 336 corresponds in general to client system 130 including display 132, in FIG. 1.

Also shown in FIG. 3 is computer-readable non-transitory medium 331 having narrative visualization software code 320 stored thereon. The expression "computer-readable non-transitory medium," as used in the present application, refers to any medium, excluding a carrier wave or other transitory signal, that provides instructions to hardware processor 334 of computer 338. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory media include, for example, optical discs, RAM, programmable read-only memory (PROM), erasable PROM (EPROM), and FLASH memory.

According to the implementation shown in FIG. 3, computer-readable non-transitory medium 331 provides narrative visualization software code 320 for execution by hardware processor 334 of computer 338. Narrative visualization software code 320 corresponds in general to narrative visualization software code 120/220, in FIGS. 1/2, and is capable of performing all of the operations attributed to those corresponding features by the present disclosure. In other words, in implementations in which hardware processor 334 of system 130/330 accesses computer-readable non-transitory medium 331 and executes narrative visualization software code 320, system 130/330 may perform any of the actions attributed to narrative visualization system 110 by the present disclosure.

Figure 4:
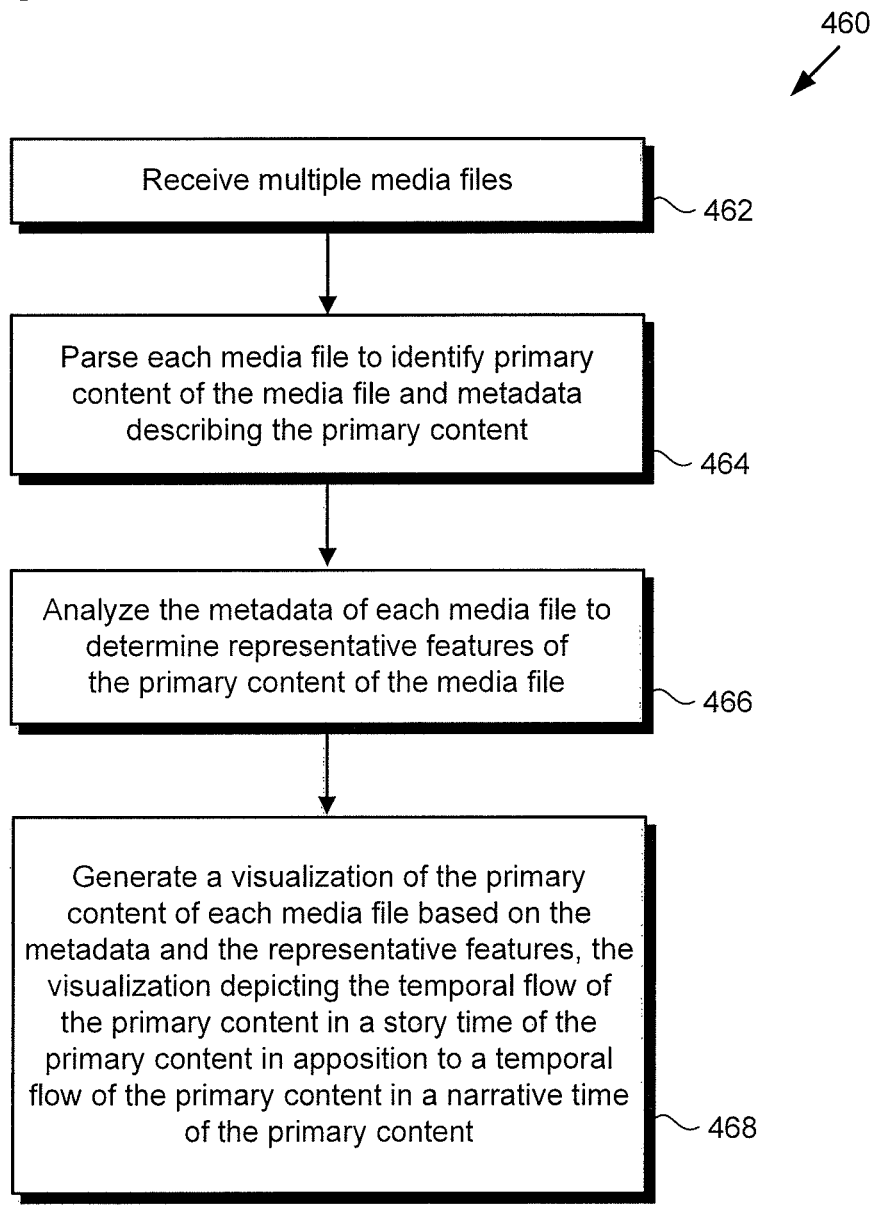
FIG. 4 shows a flowchart presenting an exemplary method for generating narrative visualizations, according to one implementation.
Figure 5:
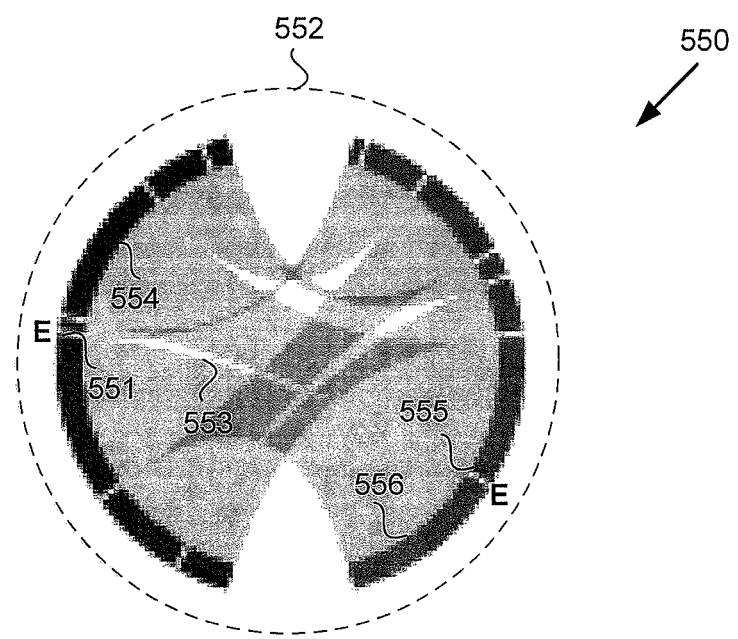
FIG. 5 shows an example of a narrative visualization generated through use of the systems and methods disclosed in the present application, according to one implementation.

The functionality of narrative visualization software code 120/220/320 will be further described by reference to FIG. 4 in combination with FIGS. 1, 2, 3, and 5. FIG. 4 shows flowchart 460 presenting an exemplary method for use by a system, such as system 110/130/330, for generating narrative visualizations. FIG. 5 shows an example of a narrative visualization generated through use of the systems and methods disclosed in the present application, according to one implementation.

Referring now to FIG. 4 in combination with FIGS. 1 and 2, flowchart 460 begins with receiving multiple media files 140a/140b/240 (action 462). By way of example, system user 146 may utilize client system 130 to interact with narrative visualization system 110 in order to generate visualizations 250 of primary content 242 contained in media files 140a/140b/240. In one implementation, system user 146 may transmit one or more of media files 140a/140b/240 from client system 130 to narrative visualization system 110 via network 102 and network communication links 104. Alternatively, one or more of media files 140a/140b/240 may be received from a third party source of media content, or may reside as a stored media file in system memory 116/336. Media files 140a/140b/240 may be received by narrative visualization software code 120/220/320, executed by hardware processor 114/334.

Flowchart 460 continues with parsing each of media files 140a/140b/240 to identify primary content 242 of each of media files 140a/140b/240 and metadata 244 of each of media files 140a/140b/240 describing primary content 242 (action 464). Primary content 242 may be any type of content for which the relationship of narrative time to story time may be of interest. Thus, media files 140a/140b/240 may include primary content 242 in the form of one of a movie script, a play script, a digital book, poetry, one or more episodes of a television series, animation, and a game, to name a few examples. In addition, media files 140a/140b/240 may include metadata 244 describing primary content 242.

For example, in implementations in which primary content 242 is a movie script, metadata 244 describing primary content 242 may identify dramatic characters, interactions among dramatic characters, and/or narrative setting included in the movie script. Parsing of media files 140a/140b/240 to identify primary content 242 and metadata 244 may be performed by narrative visualization software code 120/220/320, executed by hardware processor 114/334, and using media file parsing module 222. It is noted that, in addition to, or in lieu of, metadata 244 included in media files 140a/140b/240, in some implementations, narrative visualization software code 120/220/320 may be executed by hardware processor 114/334 to receive metadata 248 describing primary content 242 from third party metadata source 148.

Flowchart 460 continues with analyzing metadata 244 and/or 248 for each of media files 140a/140b/240 to determine representative features 226 of primary content 242 (action 466). Examples of such representative features may include narrative time, story time, narrative settings, the inclusion of dramatic characters in various narrative settings, the prominence of dramatic characters with respect to the storyline, interactions among dramatic characters, and the emotional state or sentiment of dramatic characters, to name a few. Analysis of metadata 244 and/or 248 and determination of representative features 226 of primary content 242 may be performed by narrative visualization software code 120/220/320, executed by hardware processor 114/334, and using narrative analysis module 224.

Flowchart 460 can conclude with generating visualizations 250 of primary content 242 of each of media files 140a/140b/240 based on metadata 244 and/or 248 and representative features 226 of primary content 242 (action 468). Generation of visualizations 250 of primary content 242 based on metadata 244 and/or 248 and representative features 226 of primary content 242 may be performed by narrative visualization software code 120/220/320, executed by hardware processor 114/334, and using visualization generator module 228.

Referring to FIG. 5, FIG. 5 shows exemplary visualization 550 of primary content 242 included in one of media files 140a/140b/240, according to one implementation. It is noted that visualization 550 corresponds in general to any one of visualizations 250, in FIG. 2. Consequently, visualization 550 and any of visualizations 250, in respective FIGS. 5 and 2, may share the characteristics attributed to any of those corresponding features by the present disclosure.

Visualization(s) 250/550 are generally circular, as shown by dashed circle 552 surrounding visualization(s) 250/550. In addition, and as shown in FIG. 5, visualization(s) 250/550 depict the temporal flow of narrative time of primary content 242 by arc 554, and further depict the temporal flow of story time of primary content 242 by arc 556, shown in apposition to arc 554. According to the exemplary implementation shown in FIG. 5, a counter-clockwise progression along arc 554 is linear in the narrative time of primary content 242, while a clockwise progression along arc 556 is linear in the story time of primary content 242.

In addition, and as further shown in FIG. 5, connecting lines between arc 554 and arc 556 indicate the temporal relationship between the narrative time and story time of primary content 242 by linking the position of an event in the temporal flow of narrative time with the position of the same event in the temporal flow of story time. For example, referring to visualization 550, exemplary connecting line 553 links position 551 of event "E" in the temporal flow of the narrative time of primary content 242 with position 555 of the same event "E" in the temporal flow of the story time of primary content 242.

In some implementations, the exemplary method outlined in flowchart 460 may further include rendering visualization(s) 250/550 of primary content 242 generated for each of at least some of media files 140a/140b/240 for concurrent display to system user 146. Rendering of multiple visualization(s) 250/550 of primary content 242 for concurrent display to system user 146 may be performed by narrative visualization software code 120/220/320, executed by hardware processor 114/334, and using GUI 118/218.

Figure 6:
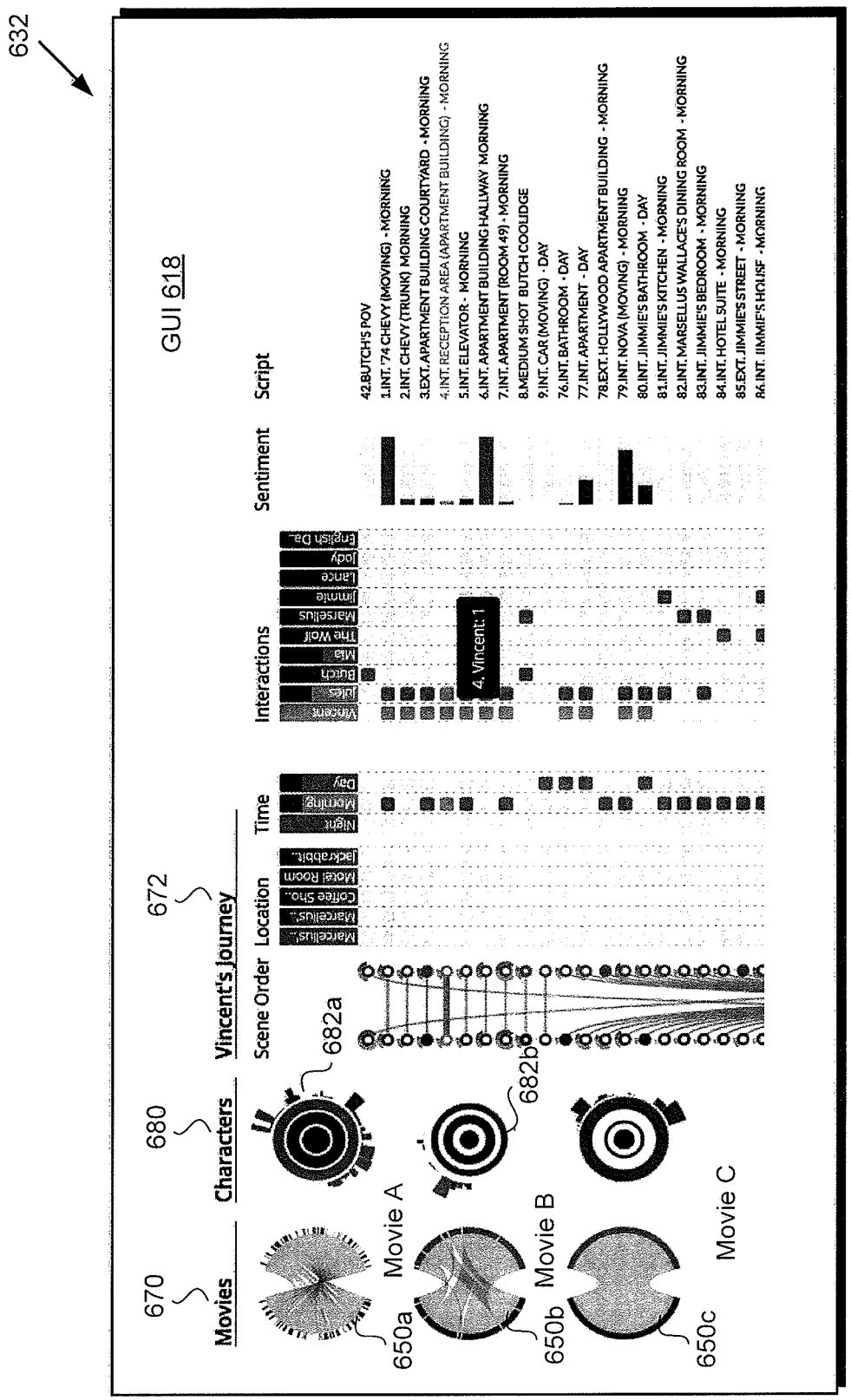
FIG. 6 shows multiple narrative visualizations rendered for display to a system user, according to one implementation.

Referring to FIG. 6, FIG. 6 shows GUI 618 presented on display 632 and concurrently displaying visualizations 650a, 650b, and 650c generated for primary content 242 taking the form of different movies 670. For example, visualization 650a is representative of Movie A, visualization 650b is representative of Movie B, and visualization 650c is representative of Movie C. Display 632 corresponds in general to displays 132/332 in FIGS. 1/3 and may share any of the characteristics attributed to those corresponding features by the present disclosure.

In addition, GUI 618 corresponds in general to GUI 118/218 in FIGS. 1/2 and each of those features may share the characteristics attributed to any of those corresponding features by the present disclosure. Moreover, visualizations 650a, 650b, and 650c correspond in general to visualization(s) 250/550 in FIGS. 1/5 and may share any of the characteristics attributed to those corresponding features by the present disclosure.

FIG. 6 also shows additional visualizations in the form of circular visualizations 682a and 682b corresponding respectively to dramatic characters 680 appearing in one of movies 670, i.e., a movie from among movies 670 selected by system user 146 via GUI 118/218/618. In other words, in addition to providing a display interface for concurrent display of visualizations 650a, 650b, and 650c, GUI 118/218/618 enables system user 146 to interact with visualizations 650a, 650b, and 650c. As further shown in FIG. 6, system user 146 may utilize GUI 118/218/618 to select further visualization 672 specific to a dramatic character corresponding to a respective one of circular visualizations 682a and 682b.

Figure 7:
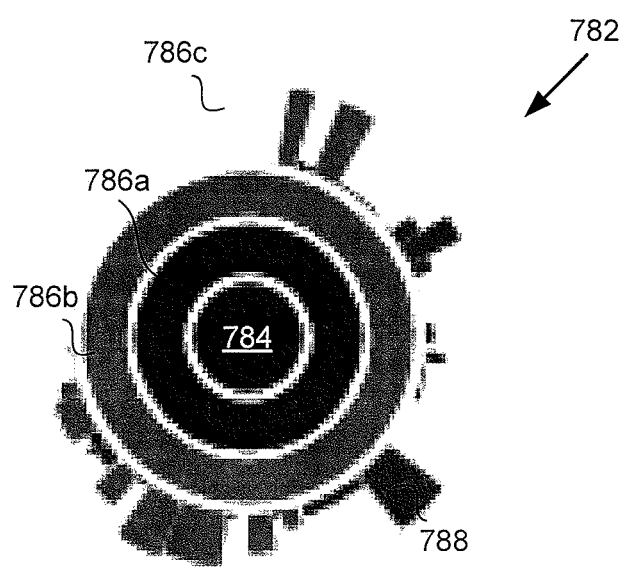
FIG. 7 shows an additional circular visualization corresponding to a dramatic character selected by a system user, according to one implementation.

FIG. 7 shows circular visualization 782 corresponding to a dramatic character selected by system user 146, according to one implementation. As shown in FIG. 7, circular visualization 782 includes central circle 784 surrounded by concentric rings 786a, 786b, and 786c having progressively greater radii. Circular visualization 782 including central circle 784 and concentric rings 786a, 786b, and 786c corresponds in general to circular visualizations 682a and 682b, in FIG. 6 and each of those features may share the characteristics attributed to any of those corresponding features by the present disclosure.

According to the exemplary implementation shown in FIG. 7, outer ring 786c of circular visualization 782 includes a radial bar corresponding respectively to each scene in primary content 242 in which the corresponding character appears. Moreover, each radial bar includes one or more of a visual cue corresponding to a duration of the scene, a visual cue indicating an emotional state of the corresponding dramatic character in the scene, and a visual cue indicating the relative participation of the corresponding character in the dialogue included in the scene. For example, referring to exemplary radial bar 788 shown in FIG. 7, radial bar 788 includes a visual cue in the form of its arc length, which indicates the relative duration of its corresponding scene. As another example, radial bar 788 includes another visual cue in the form of its radial height, which indicates the relative participation of the corresponding character in the dialogue included in the scene.

As yet another example, radial bar 788 includes yet another visual cue in the form of its color or patterned fill, which indicates the prevailing sentiment or emotional state of the corresponding dramatic character in the scene. As a specific example, where radial bar 788 includes color as a visual cue indicating emotional state or sentiment, the color may range through shades of green corresponding to positive, optimistic, and happy emotional states, yellow corresponding to more neutral emotions, and red corresponding to negative, sad, and/or angry emotions.

According to the exemplary implementation shown in FIG. 7, ring 786b includes one or more of a visual cue indicating an overall emotional state of the corresponding character and a visual cue indicating a relative participation of the corresponding character in the dialogue included in primary content 242. For example, referring to exemplary ring 786b shown in FIG. 7, ring 786b includes a visual cue in the form of its ring thickness, which indicates the relative participation of the corresponding character in the dialogue included in primary content 242. Ring 786b also includes a visual cue in the form of its color or patterned fill, which indicates the prevailing sentiment or emotional state of the corresponding dramatic character. As noted above, where color is used as a visual cue for emotional state or sentiment, the color may range through shades of green corresponding to positive, optimistic, and happy emotional states, yellow corresponding to more neutral emotions, and red corresponding to negative, sad, and/or angry emotions.

In addition, the betweeness centrality and degree centrality of the character is corresponding to circular visualization 782 may be indicated by ring 786a and central circle 784. For example, according to the exemplary implementation shown in FIG. 7, the betweeness centrality of the character corresponding to circular visualization 782 is indicated by the area of ring 786a. Moreover, the degree centrality of the character corresponding to circular visualization 782 is indicated by the area of central circle 784.

Figure 8:
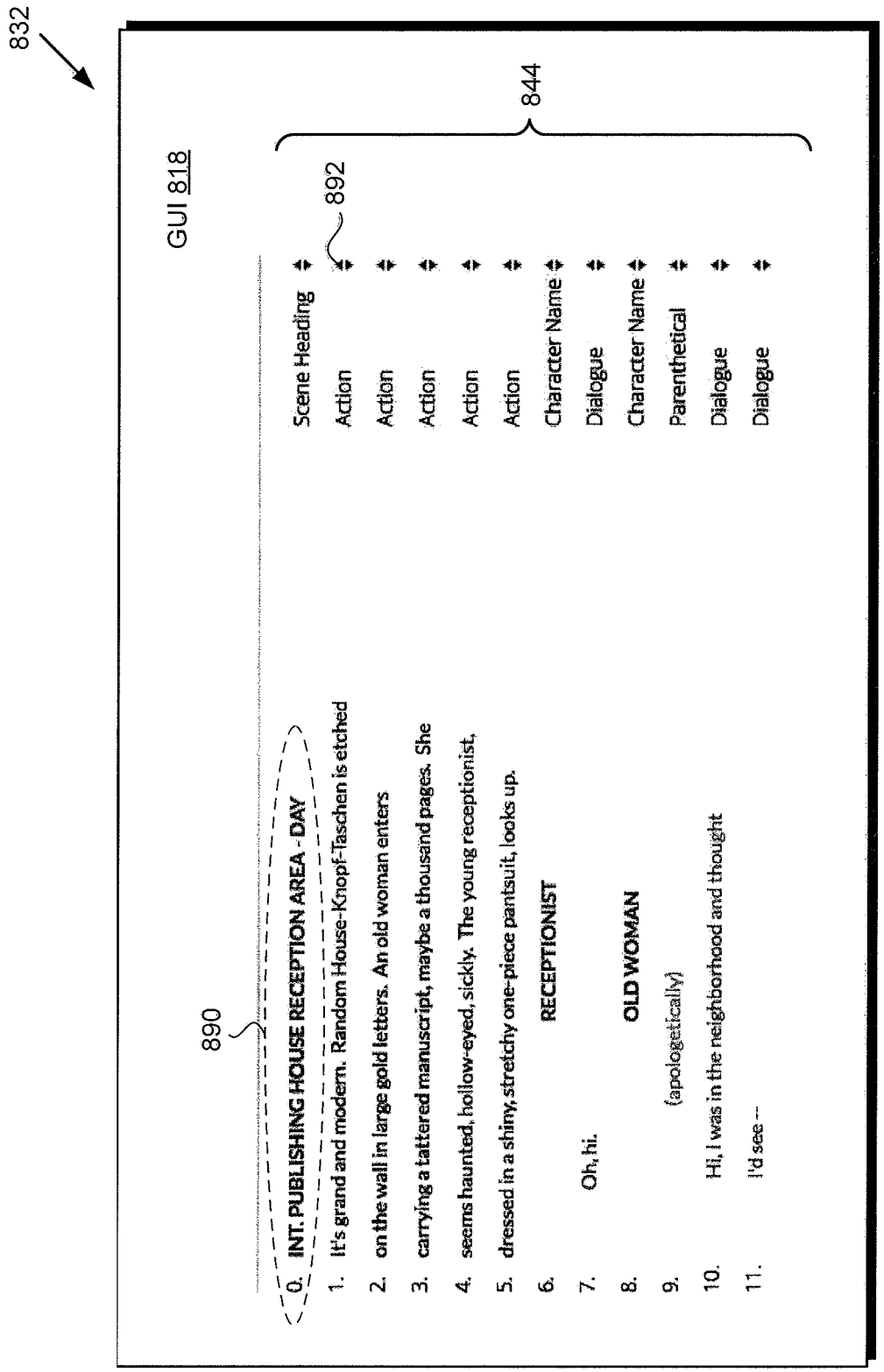
FIG. 8 shows an exemplary graphical user interface (GUI) enabling a system user to edit metadata describing a primary content, according to one implementation.

In some implementations, GUI 118/218/618 may be further configured to enable system user 146 to edit metadata 244 and/or 248 describing primary content 242. Referring to FIG. 8, FIG. 6 shows GUI 818 presented on display 832 and including editable metadata 844. Display 832 corresponds in general to displays 132/332/632 in FIGS. 1/3/6 and may share any of the characteristics attributed to those corresponding features by the present disclosure. In addition, GUI 818 corresponds in general to GUI 118/218/618 in FIGS. 1/2/6 and each of those features may share the characteristics attributed to any of those corresponding features by the present disclosure. Moreover, metadata 844 corresponds in general to metadata 244 and/or 248, in FIG. 2, and describes primary content 242.

As shown in FIG. 8, metadata 844 identifies scene 890 using a scene heading metadata tag. As further shown in FIG. 8, features appearing in scene 890 are variously identified by tags such as "action," "character name," "dialogue," and "parenthetical" included as selectable tags of metadata 844. System user 146 can utilize GUI 118/218/ 618/818 to edit metadata 844 by selectively changing the tag assigned to features of scene 890 via a respective selection menu for each feature. For example, exemplary selection menu 892 may be used by system user 146 to change the "action" tag applied to feature "1" of scene 890. Consequently, narrative visualization software code 120/220/320, executed by hardware processor 114/334, and using GUI 118/218/618/818 can advantageously be utilized by system user 146 to review, verify and/or correct metadata 844.

Thus, the present application discloses a narrative visualization solution that addresses and overcomes the deficiencies in the conventional art by substantially optimizing the process of evaluating and comparing complex storylines. By generating visualizations of the primary media content contained in media files that depict the story time of the primary content in apposition to its narrative time, the present application discloses a solution that renders the temporal flow of the primary content visually recognizable. In addition, by providing a GUI enabling a system user to select and interact with a visualization of primary content, the present solution provides a powerful tool for exploration and evaluation of the primary content. Moreover, by enabling the system user to navigate to additional visualizations, such as circular visualizations profiling the participation of respective dramatic characters in narrating the story, the present solution advantageously allows the system user to investigate the prominence of various characters with respect to the storyline.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A narrative visualization system comprising:
a computing platform including a hardware processor and a system memory;
a narrative visualization software code stored in the system memory;
the hardware processor configured to execute the narrative visualization software code to:
parse a media file to identify a primary content of the media file and metadata describing the primary content;
analyze the metadata to determine representative features of the primary content; and
generate a visualization of the primary content based on the metadata and the representative features;
wherein the visualization depicts a story temporal flow of the primary content in a story time of the primary content in relation to a narrative temporal flow of the primary content in a narrative time of the primary content, wherein the narrative time of the primary content corresponds to a sequential scene advancement of a plurality scenes of the primary content from a first scene in the primary content to a last scene in the primary content, wherein the story time of the primary content corresponds to a time event advancement of the plurality scenes of the primary content from a past time event to a future time event, and wherein the story time is different than the narrative time.

2. The narrative visualization system claim 1, wherein the plurality of scenes in the primary content have a different order in the narrative time than in the story time.

3. The narrative visualization system claim 1, wherein the visualization further includes a connecting line between the story temporal flow and the narrative temporal flow indicating a temporal relationship between the story temporal flow and the narrative temporal flow by linking a story position of an event in the story temporal flow with a narrative position of the same event in the narrative temporal flow.

4. The narrative visualization system claim 1, wherein the hardware processor is further configured to execute the narrative visualization software code to:
render the visualization on a display for a system user; and
provide a graphical user interface (GUI) on the display enabling interaction by the system user with the visualization, and wherein the GUI is configured to enable the system user to edit the metadata describing the primary content.

5. The narrative visualization system claim 1, wherein the visualization includes a circular visualization corresponding respectively to each of at least some of a plurality of characters included in the primary content.

6. The narrative visualization system claim 5, wherein the GUI is configured to enable the system user to select one of the circular visualizations for further visualization specific to the corresponding character.

7. The narrative visualization system claim 5, wherein each of the circular visualizations includes a central circle surrounded by a plurality of concentric rings having progressively greater radii.

8. The narrative visualization system claim 7, wherein one of the concentric rings includes at least one of a first visual cue indicating an overall emotional state of the corresponding character and a second visual cue indicating a relative participation of the corresponding character in a dialogue included in the primary content.

9. The narrative visualization system claim 7, wherein one of the concentric rings includes a radial bar corresponding respectively to each scene in the primary content in which the corresponding character appears, each radial bar including at least one of a first visual cue corresponding to a duration of a scene, a second visual cue indicating an emotional state of the corresponding dramatic character in the scene, and a third visual cue indicating a relative participation of the corresponding character in a dialogue included in the scene.

10. A method for use by a system including a computing platform having a hardware processor and a system memory storing a narrative visualization software code, the method comprising:
parsing, using the hardware processor, a media file to identify a primary content of the media file and metadata describing the primary content;
analyzing, using the hardware processor, the metadata to determine representative features of the primary content; and
generating, using the hardware processor, a visualization of the primary content based on the metadata and the representative features;

wherein the visualization depicts a story temporal flow of the primary content in a story time of the primary content in relation to a narrative temporal flow of the primary content in a narrative time of the primary content, wherein the narrative time of the primary content corresponds to a sequential scene advancement of a plurality scenes of the primary content from a first scene in the primary content to a last scene in the primary content, wherein the story time of the primary content corresponds to a time event advancement of the plurality scenes of the primary content from a past time event to a future time event, and wherein the story time is different than the narrative time.

11. The method of claim 10, wherein the plurality of scenes in the primary content have a different order in the narrative time than in the story time.

12. The method of claim 10, wherein the visualization further includes a connecting line between the story temporal flow and the narrative temporal flow indicating a temporal relationship between the story temporal flow and the narrative temporal flow by linking a story position of an event in the story temporal flow with a narrative position of the same event in the narrative temporal flow.

13. The method of claim 10, further comprising:
rendering, using the hardware processor, the visualization on a display for a system user; and
providing, using the hardware processor, a graphical user interface (GUI) on the display enabling interaction by a system user with the visualization, wherein the GUI is configured to enable the system user to edit the metadata describing the primary content.

14. The method of claim 10, wherein the visualization includes a circular visualization corresponding respectively to each of at least some of a plurality of characters included in the primary content.

15. The method of claim 14, wherein the GUI is configured to enable the system user to select one of the circular visualizations for further visualization specific to the corresponding character.

16. The method of claim 14, wherein each of the circular visualizations includes a central circle surrounded by a plurality of concentric rings having progressively greater radii.

17. The method of claim 16, wherein one of the concentric rings includes at least one of a first visual cue indicating an overall emotional state of the corresponding character and a second visual cue indicating a relative participation of the corresponding character in a dialogue included in the primary content.

18. The method of claim 16, wherein one of the concentric rings includes a radial bar corresponding respectively to each scene in the primary content in which the corresponding character appears, each radial bar including at least one of a first visual cue corresponding to a duration of a scene, a second visual cue indicating an emotional state of the corresponding dramatic character in the scene, and a third visual cue indicating a relative participation of the corresponding character in a dialogue included in the scene.

* * * * *